United States Patent [19]

Vejux

[11] 4,172,350

[45] Oct. 30, 1979

[54] CUTTER UNIT FOR MOWING MACHINE

[76] Inventor: Michel Vejux, 5 bis rue de Strasbourg, 90000 Belfort, France

[21] Appl. No.: 882,390

[22] Filed: Mar. 1, 1978

[30] Foreign Application Priority Data

Mar. 8, 1977 [FR] France ................. 77 07037

[51] Int. Cl.$^2$ .......................................... A01D 55/18
[52] U.S. Cl. ..................................................... 56/294
[58] Field of Search .............. 56/294, 249, 249.5, 56/289

[56] References Cited

U.S. PATENT DOCUMENTS 2,767,543 10/1956 Ream ............................ 56/249
2,790,293 4/1957 Crotty ........................... 56/294

Primary Examiner—Jay N. Eskovitz

Attorney, Agent, or Firm—Fleit & Jacobson

[57] ABSTRACT

A cutter unit for a mowing machine comprises a transverse shaft provided with successive pairs of thread portions of inverted pitch which are connected with each other in the center of the pair by a radial edge facing forwardly with respect to the direction of rotation of the shaft. Each pair cooperates with lateral cutters against which the threads urge the grass. The unit further includes longitudinal fingers carried by the non-rotating portion of the unit between the successive pairs of guide the grass blades towards the thread portions. The junctions of the successive pairs form depressions which eject the grass upwardly and rearwardly. This action is facilitated by transverse deflector blades disposed somewhat rearwardly of the shaft and close to the upper periphery of the thread portions.

8 Claims, 4 Drawing Figures

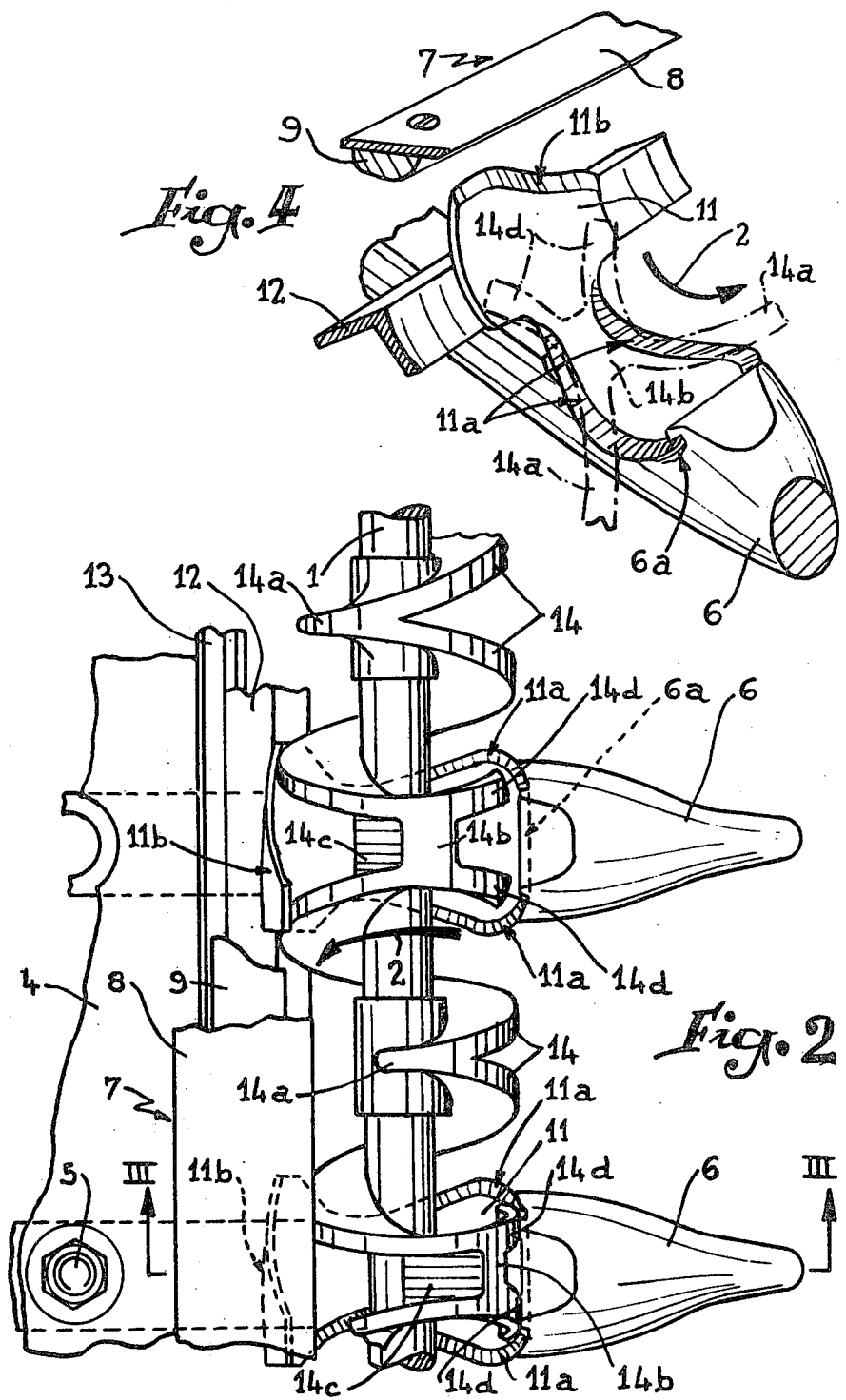

CUTTER UNIT FOR MOWING MACHINE

The present invention relates to rotating cutter units for mowing machines.

It is known that such units comprise a rotor which rotates continuously in the same direction about an axis transverse to the advancing direction of the machine, the said rotor carrying a number of feed members adapted to urge the grass blades against one or more knives associated to guiding fingers fixed to a stator mounted on the frame of the machine, the said stator including an appropriate deflector.

It is an object of the present invention to facilitate the advance of the rotor through the grass while avoiding that some of the grass blades may be merely laid and more or less crushed on the ground.

Another object of the invention is to improve the cutting effect by so arranging the rotating members that they guide and urge the grass blades towards and against the lateral cutting edge of the knives, the transverse velocity component imparted to these grass blades being such that they are applied against the said knives under the action of their own momentum, while the grass thus cut is thrown rearwardly by the rotor above the statoric deflector.

Still another object of the present invention is to avoid that the grass blades may become wound around the rotor.

In accordance with the invention the rotating members carried by the rotor are formed of a continuous series of helicoidal surfaces or thread portions, each extending angularly through more than 360°, while the space comprised between each two successive guiding fingers of the stator encompasses a pair of such surfaces of opposed obliquities which are connected with each other at their front end with respect to the direction of rotation of the rotor so as to form a substantially radial edge while the rear ends of the adjacent pairs define a depression which rejects the grass and a plain portion followed by two rearwardly directed diverging arms.

In the annexed drawing:

FIG. 2 is an enlarged plan view thereof.

FIG. 4 is a perspective view illustrating the cleaning effect of the diverging tails of the rotor threads.

Figure 1:
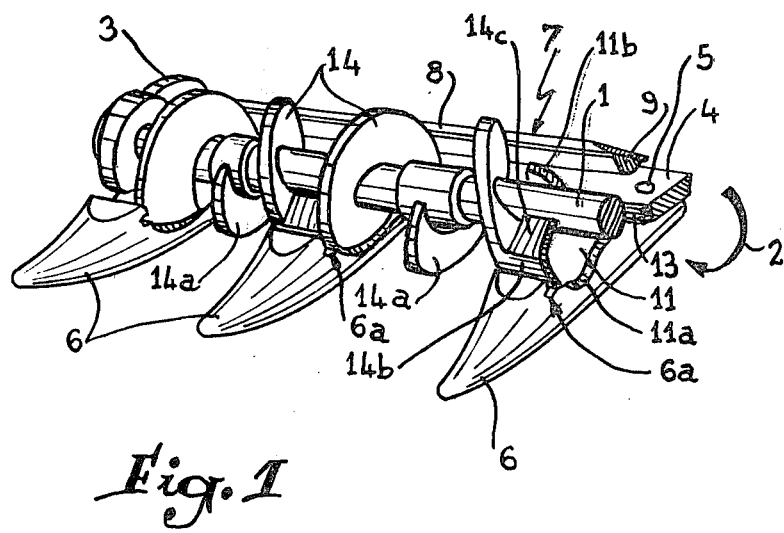
FIG. 1 is a fragmental perspective view of a preferred embodiment of the present invention.
Figure 3:
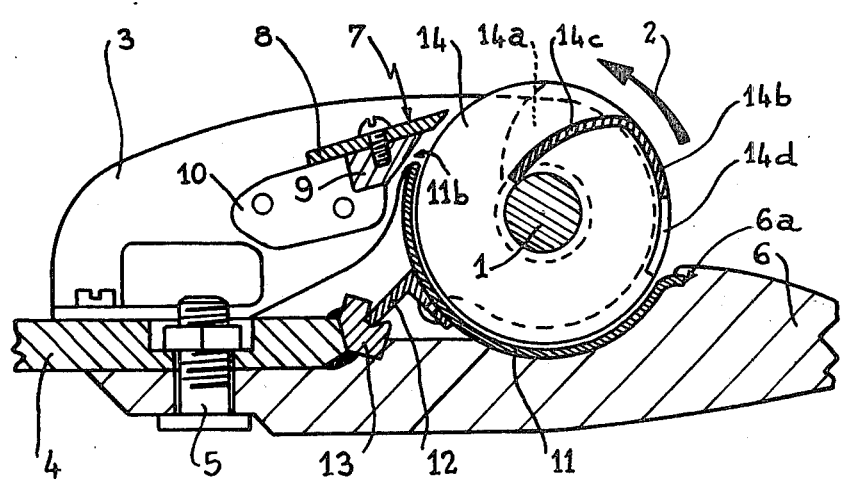
FIG. 3 is a transverse section taken along line III—III of FIG. 2.

The rotor of the cutter unit illustrated in FIGS. 1 to 3 comprises a shaft 1 which rotates in the direction indicated by arrow 2. Shaft 1 is rotatably supported at spaced intervals in brackets such as 3 carried by the non-rotating portion or stator of the machine, this stator including a flat longitudinal frame 4. Bolts such as 5 secure to the lower side of frame 4 a number of elongated separating fingers 6 the pointed ends of which project in front of the frame parallel to the advancing direction of the machine.

The stator also comprises a longitudinal deflector 7 formed of a number of blades 8 the cutting edge of which is directed forwardly, each being carried by a transverse bar 9 having at its ends lugs 10 by means of which it is fixed to two successive brackets 3.

The stator further comprises knives 11 having a concave cross-section concentric to shaft 2, each being situated above a finger 6. As best shown in FIG. 3, knives 11 are fixed onto a slide 12 which is slidably engaged in a groove of a guide 13 welded to the front edge of frame 4 in such manner that all these knives may be removed and re-mounted, as for instance for being sharpened, by merely displacing slide 12. The front edge of each knife 11 is moreover engaged in a groove 6a provided in each finger 6 which thus acts as a retaining support. It will be noted that each knife 11 has two lateral cutting edges which have been referenced 11a in FIG. 4, and an upper cutting edge 11b which is at an angle to the horizontal. Furthermore each knife 11 is of somewhat reduced width in its central portion, so that its lateral cutting edges 11a are also obliquely directed with respect to a plane transverse to shaft 1.

Shaft 1 is integral with a series of feed members realized in the form of flat helicoidal thread portions 14 each of which extends angularly through more than 360°. As illustrated in FIGS. 1 and 2 two such thread portions 14 of inverted pitch are disposed between each two successive fingers 6 and the arrangement is such that the radial edge 14a formed at their junction, midway of the two fingers 6 under consideration in the plan view of FIG. 2, faces in the direction of rotation of shaft 1 (see arrow 2). In other words edge 14a corresponds to the "upstream" end of a pair of thread portions 14. The other ends or "downstream" ends of the pair are connected with the corresponding ends of the adjacent pairs by bridge portions 14b of noticeable width. Each bridge portion 14b has an oblique upstream side 14c which may be considered as the bottom of a depression, while its downstream side is formed with two diverging fingers 14d which form a bifurcated tail portion.

The operation is as follows:

The rotor 1-14 of the machine being rotated in the direction of arrow 2 while the machine itself is advanced towards the right in FIGS. 1 to 3, the blades of grass are guided by fingers 6 and are caught between the rotating thread portions 14 which urge them against the lateral cutting edges 11a of knives 11. It is important to note that owing to the relatively high rotating speed of shaft 1 and to the high transverse speed component which the thread portions 14 therefore impart to the grass blades, the latter are applied against knives 11 not only by the mechanical pressure exerted by the said portions, but also by their own momentum. It is further to be remarked that the cutting action of blades 8 also plays its role in the operation. The grass thus cut is collected between the adjacent pairs of thread portions 14 and it is thus thrown backwardly above deflector 7 under the combined effect of the obliquity of side 14c and of centrifugal force. There is no tendency for the rotor to retain clumps of agglomerated grass.

The blades 8 of deflector 7 and the upper cutting edge 11b of knives 11 cut any blade or stem which would tend to become wound on rotor 1-14. It will further be noted that at each revolution of this rotor the diverging tails 14d act as scrapers to clean the inner surface of knives 11.

Blades 8 are preferably removable to facilitate their re-sharpening and also for cleaning purposes. Deflector 7 may be fixed to brackets 3 by resilient means in order that it may swing backwardly under the action of a hard body wedged between a thread portion 14 and the adjacent blade 8.

What I claim is:

1. A cutter unit having a front side and a rear side for a mowing machine comprising:
   a stator having a substantially horizontal transverse front edge;

a plurality of guiding fingers carried at spaced intervals by said stator with their free ends extending forwardly from said front edge, said fingers defining between them successive intermediate spaces;

a plurality of knives carried by said stator, each substantially above one of said fingers and each having at least one lateral cutting edge extending within one of said intermediate spaces near said one of said fingers; and a rotor including a transverse shaft rotating continuously in the same direction and a series of pairs of pairs of helicoidal thread portions, with each pair being substantially disposed in one of said intermediate spaces rearwardly of the free ends of said guiding fingers, with the thread portions of each pair being of inverted pitch and with their arrangement being such that their junction substantially in the middle of said one of said intermediate spaces defines a substantially radial edge facing forwardly with respect to the direction of rotation of said shaft to urge the grass blades laterally against said knives, while the adjacent pairs are connected with each other by recessed portions adapted to eject the cut grass upwardly and forwardly.

2. In a cutter unit as claimed in claim 1, said knives being of arcuate shape to closely surround an angular portion of said rotor.

3. In a cutter unit as claimed in claim 2, said knives having a front cutting edge to cut any grass blade wound on the periphery of said thread portions.

4. In a cutter unit as claimed in claim 2, said cutting edge of said knives being obliquely disposed substantially along an arc of a helix of same hand as the adjacent one of said thread portions.

5. In a cutter unit as claimed in claim 1, each of said recessed portions extending rearwardly with respect to the direction of rotation of said shaft in the form of two diverging tails.

6. A cutter unit as claimed in claim 1, further comprising deflector means having an acute edge extending transversely close to said thread portions to deflect grass ejected from said recessed portions.

7. In a cutter unit as claimed in claim 1, said knives being secured to a common transverse support slidable mounted on said stator.

8. In a cutter unit as claimed in claim 1, each of said thread portions extending angularly through more than 360°.

* * * * *